Patented Nov. 16, 1943

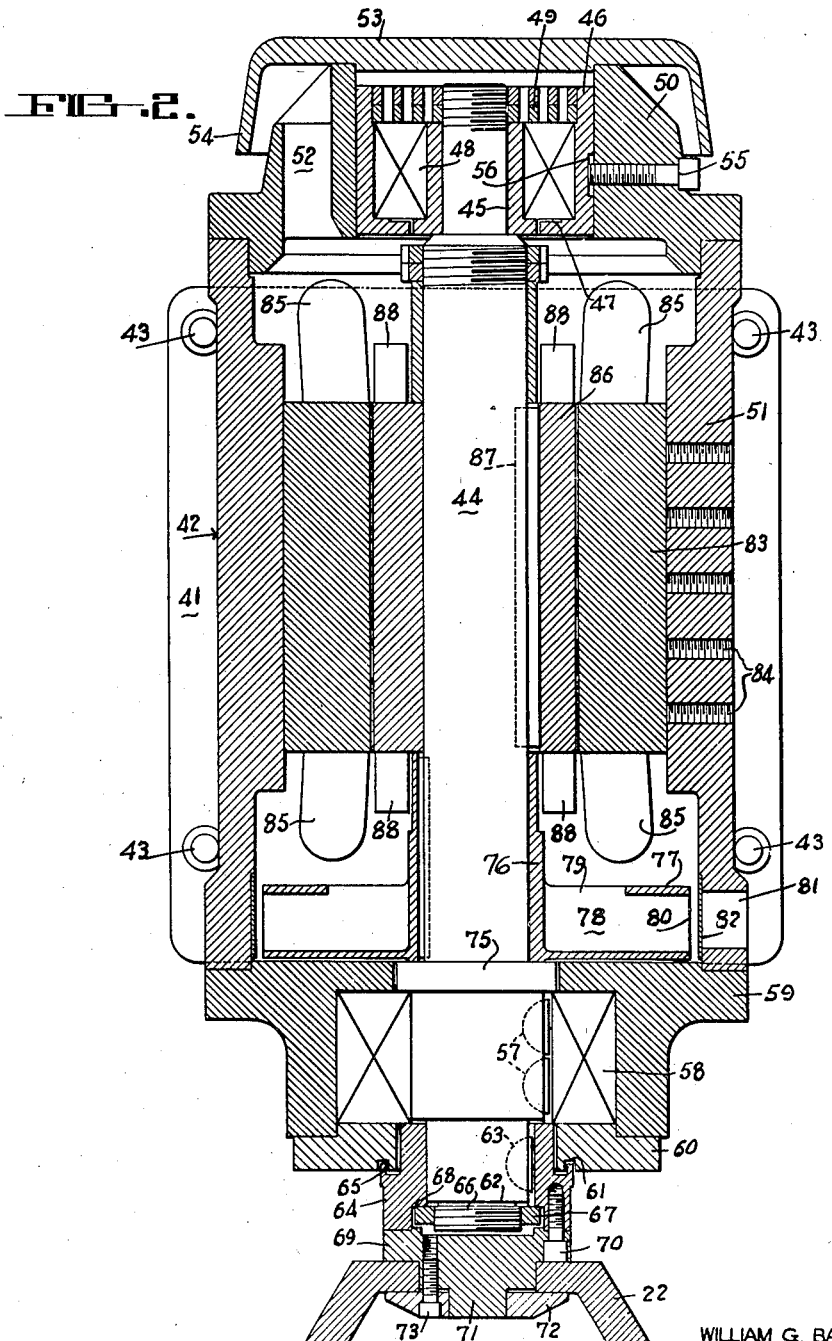

2,334,238

UNITED STATES PATENT OFFICE 2,334,238

SURFACE GRINDER SPINDLE BEARING

William G. Baldenhofer, Springfield, Ohio, assignor to The Thompson Grinder Co., Springfield, Ohio, a corporation of Ohio Original application December 22, 1941, Serial No. 424,033. Divided and this application August 3, 1942, Serial No. 453,395

3 Claims. (Cl. 51—109)

The present invention relates to precision working tools, and more particularly to machines for cutting, abrading or finishing surfaces and grooves, wherein a precision of dimension, spacing and angularity of the surfaces and the grooves is required.

This application is a division of my application Ser. No. 424,033 filed Dec. 22, 1941.

In the metal-working arts it is often necessary to provide work surfaces which extend in different directions and bear accurate positional and directional relations with respect to one another. For example, certain types of machines, such as planers, shapers, grinders, etc. require dove-tail grooves and flat bearing surfaces which must not only conform with great accuracy to the specified dimensions, but with equal precision from the standpoint of direction and angularity of the surfaces, grooves, etc.

Heretofore, when machining a plurality of grooves, it has been customary first to work one of the surfaces to its finished dimensions and then to move the workpiece to a new position so that the second surface or groove may be likewise machined and finished. But there is no assurance that the workpiece will have been placed orientated in the second or another position to provide machined surfaces which come within the assigned tolerances.

In the parent application of which this case is a division, there is disclosed and claimed a machine for grinding horizontal and vertical surfaces successively. The mechanism for grinding the vertical surface includes a motor mounted on a vertical shaft which carries at its end a horizontally disposed grinding wheel. The present invention relates more especially to an improved structure by which the grinding wheel is secured to the vertical shaft.

The invention will be better understood when the following description is read in connection with the accompanying drawings.

In the drawings:

Figure 2 is an enlarged sectional view of one of the abrading elements and the actuating motor therefor. This sectional view is taken along the line 2—2 in Figure 1.

Figure 1:
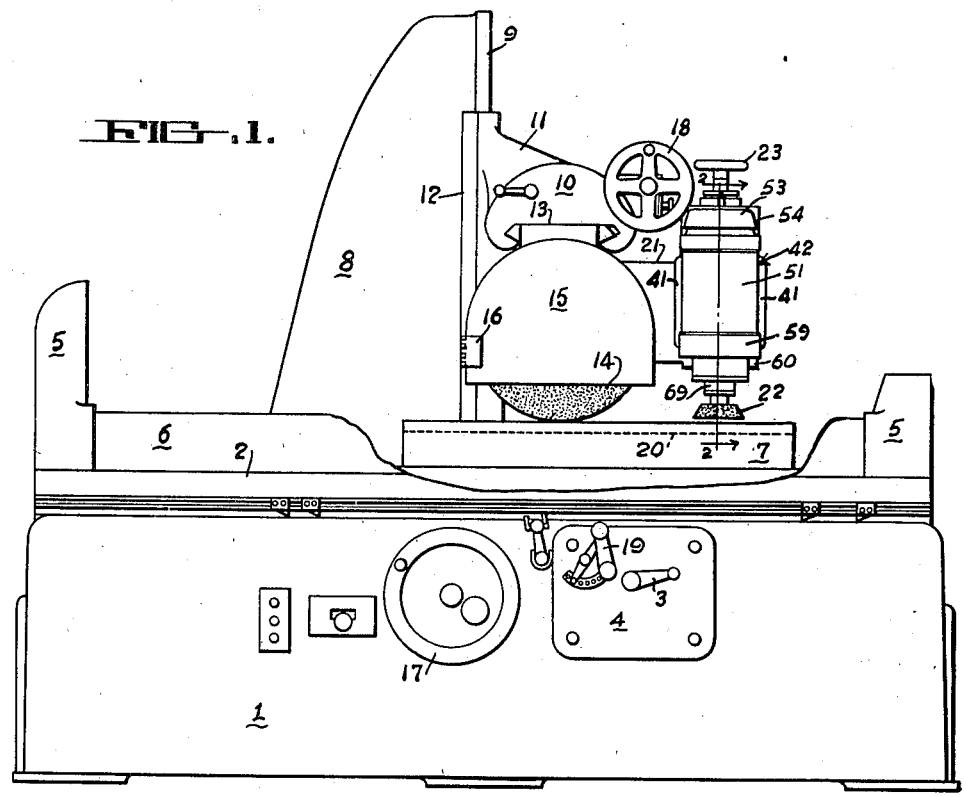
Figure 1 is a side elevational view of the improved machine showing a plurality of cutting or abrading surfaces, and in which one of the surfaces is in contact with the workpiece and the second surface is out of contact therewith.

The invention has been typified by way of a grinding machine, but it will be understood that the principles of my invention may be applied equally well to all kinds of cutting, shaping, machining and abrading machines, in which close tolerances are required not only as to the dimensions, spacings, depths and widths of the finished surfaces, but also the angle which the various surfaces make with one another.

The bed of a typical grinding machine is designated 1, and this bed carries on suitably V-shaped ways a reciprocatory carriage 2 which is usually actuated by a hydraulic motor (not shown) under the control of a lever 3 mounted on the apron 4. The carriage 2 is provided at each end with upstanding spark shields 5 and at opposite sides thereof there is also provided an upstanding sheetmetal rib 6, which also serves to intercept the sparks. The workpiece is indicated at 7, and may be secured to the carriage 2 in any suitable and well known manner, for example, by means of a magnetic clamp or a number of mechanical clamps which fit into T-grooves extending longitudinally of the carriage. The grinding wheel structure is supported on an upstanding hollow box type of frame 8, which is tapered at the top and terminates at the right-hand edge, as seen in Figures 1 and 2, in a dove-tail slide 9 which is case hardened. The saddle 10 is carried by the upright 8, the saddle being provided with an elongated flange member 11 which is provided with a dove-tail groove adapted to receive the slide or tongue, and carrying gibs 12 at the rear side in order to assure a fairly tight but slidable fit.

The saddle 10 extends for a considerable distance in the vertical direction, and is provided at its lower side with a double V-shaped groove 13 which extends the entire length of the saddle and carries the wheel head (not shown). The wheel head is provided with a spindle on which is mounted a grinding wheel 14 which is positioned in the vertical direction. A guard member 15 is preferably provided at the outside of the wheel, this guard member being hinged to the wheel head, as indicated at 16. The saddle 10 contains a hydraulic motor which is so connected to the tongue 13 that when pressure fluid is applied to the motor and controlled by the wheel 17, the wheel head and the wheel 14 are caused to move in the horizontal direction across the machine in order to provide a crossfeed for the grinder. In addition, the crossfeed mechanism may be manually actuated by means of suitable gearing which terminates in a hand wheel 18, and there is provided suitable protection apparatus which prevents simultaneous operation of the hydraulic motor and the hand wheel. In other words, the cross slide is operated either manually, by the wheel 18, or automatically by hydraulic pressure controlled at the wheel 17, but not simultaneously by these two agencies. When the hydraulic feed is employed the speed of the cross-feed is controlled by a lever 19 positioned on the apron 4. It is assumed, in Figure 1, that the grinding wheel 14 is being momentarily employed to provide a straight-edged groove along the length of the workpiece 7, the depth of this groove being indicated by the dotted line 20.

It is often necessary, in manufacturing machine tools, to provide the workpiece 7 not only with a groove which extends longitudinally of the workpiece, but also a groove perhaps of the dovetail type which extends across the workpiece, i. e. exactly at 90° with respect thereto, or with any other desired angularity. In the case of high precision work the angle which one groove makes with the other is just as important as the dimensions and shapes of the grooves, so that the same close tolerances may be required.

Heretofore it has been the practice, in case a plurality of grooves became necessary and particularly where one groove extended from the other with a definite predetermined angle to form first one of the grooves in the workpiece, using the single wheel 14, and then to turn the workpiece around through the desired angle and still using the same wheel 14, to form the transverse groove. In case the second groove was of the dove-tail type, which of course could not be formed by the straight-sided grinding wheel 14, the workpiece might be taken entirely out of the machine and set up on another grinder which was especially adapted to grind grooves of this particular configuration. But the point is made that regardless of whether the same or a different grinding machine is employed to form the transverse groove, the fact remains that the position of the workpiece has been disturbed from its first position, and even when great care is exercised to re-position the workpiece so as to form the transverse groove, there is still bound to be at least a slight variation in the angularity which one groove makes with the other. These variations, even though small, may be fatal to the acceptance of the workpiece for a given tool, particularly when the results required are limited to close tolerances and high precision.

In accordance with my invention, I have eliminated the necessity for any movement of the workpiece 7 after it has been once set up in position, and which position has determined the direction of the first groove or finished surface. The improved machine is provided with an arm 21 which extends from the main wheel head, and which arm carries a second grinding wheel 22 typified as a horizontal grinder, together with its actuating element. The mechanical arrangement is such that the grinding wheel 22 may be elevated or lowered by means of a hand wheel 23, and in the position shown in Figure 1, the wheel 22 is out of contact with the workpiece because the main grinding wheel 14 is shown in contact therewith. In other words, the grinding wheels 14 and 22 are intended to be alternately used, never together.

A large webbed bracket is bolted to the wheel head extension 21. This bracket has a surface which extends in the vertical direction and is provided with a dove-tail slide. This slide is provided at the center with a relatively long, downwardly extending groove having generally a semi-circular configuration and adapted to receive a nut. In order to lighten the metal content of the tongue or slide, the latter may be hollowed out at the middle but leaving the dovetail edges intact. The nut is adapted to receive the lower end of a threaded rod which is carried at the top on ball bearings supported in a flat metal plate suitably mounted on top of the bracket. The rod is also provided at its upper end with a dial which cooperates with a stationary pointer in such a manner that the vertical position of the nut and of the grinding wheel 22 may be seen at a glance. It will be understood that as the hand wheel 23 is rotated the nut is caused to move upwardly or downwrdly, depending on the direction of rotation. This vertical movement of the nut carries with it the grinding wheel 22. The details of the motor 42 and the mechanical connections by which the motor is caused to actuate the grinding wheel 22 are shown in Figure 2.

The main shaft of the motor is shown at 44 and is provided at one end with a flanged sleeve 45 forming part of a box bearing, of which the other part is constituted of a hollow cylindrical member 46, flanged at 47 at a position in line with the flange of the sleeve 45. A bearing 48 of any suitable and well known type is received by the interior of the box-shaped member, and thrust bearings 49 may be provided at the upper end of the bearing structure. The cylindrical member 46 is surrounded by an end bearing element 50 which rests on the upper end surface of the field frame 51 of the motor 42, and is secured thereto in any suitable and well known manner. The end bearing 50 is provided with one or more longitudinally extending openings 52 which expose the interior of the field frame to the atmosphere for ventilation purposes. A cap 53 with a downwardly extending peripheral flange 54 is secured to the upper edge of the end bearing 50, this cap also resting on the flat portion of the cylindrical member 46. The flange of the cap is of sufficient size to provide a passageway for air around the outside surface of the end bearing and through the opening 52, into the interior of the motor. In order to assure that the cylindrical member 46 is maintained in a stationary position, a radially extending screw 55 may be provided in the end bearing, this screw contacting a flat surface, indicated at 56, on the cylindrical member.

The other end of the shaft 44 is keyed, as indicated at 57, to the inner race of a ball or roller bearing, generally designated 58, this bearing being contained in an end bearing member 59 of the motor. The latter is supported in any suitable and well known manner on the field frame 51 of the motor. The bearing 58 is held in the vertical position by means of a closure plate 60 which abuts the end bearing 59, this closure plate being provided with an annular groove 61, for reasons which will be described presently. The shaft 44 is provided with a reduced portion 62 which is keyed, as indicated at 63, to a rotary sleeve 64, this sleeve being provided with a vertically extending lip 65 which is received by the annular groove 61 in the closure plate. The lower end of the shaft portion 62 terminates in threads 66 for receiving a nut 67 which abuts a countersunk surface 68 on the sleeve 64. The latter is therefore held to the shaft in the vertical direction by means of the nut 67, and this sleeve serves to maintain the shaft 44 in its proper vertical position with respect to the stationary parts of the motor, including the field frame 51. Directly below the sleeve 64 there is a combined washer and spacer 69, this washer being provided with a number of cap screws 70 which secure the washer to the rotating sleeve 64. The washer terminates at the bottom in a centrally positioned pin 71 for receiving a cap 72 which is bolted to the spacer 69 as indicated at 73.

The grinding wheel 22 may take the shape of the frustum of a cone depending on the shape of the dove-tail groove 74 which it is desired to cut and finish off in the workpiece 7. The grinding wheel is hollow, and is provided with a flat surface sufficiently large to receive the cap 72 so that the latter bears against a considerable proportion of the grinding wheel interior. The grinding wheel 22 is therefore effectively secured to the shaft 44 through the spacer 69, the sleeve 64, through the key 63 to the shaft portion 62. The manner of securing the grinding wheel 22 to the shaft of the motor is important since the grinding wheel is hung in a vertical direction and is often of a complex shape determined by the size and shape of the dove-tail groove 74. I have found that when the grinding wheel is mounted in the manner described hereinbefore, a long life for the grinding wheel may be expected as the cap 72 provides a compressional stress of uniform intensity over a large area of the grinding wheel.

There is a collar 75 provided on the shaft 44, this collar serving to support a sleeve member 76 which is integrally joined to a hollow radially extending portion 77. The latter is provided with air passageways 78, the inlet and outlet openings for the passageways being indicated at 79 and 80, respectively. In line with the outlet port 80 are one or more openings 81 in the field frame, these openings being provided on the interior with a strainer or grill 82. Consequently, the air which enters the passageway 52 at the top end of the motor passes longitudinally through the motor and leaves the latter through the port 79, the passageway 78, the port 80 and the opening or openings 81 to the exterior. The grill 82 at the lower openings 81 and the overhanging portion 54 at the upper end of the motor are highly desirable in preventing grinding dust from entering the motor. The field magnets of the motor are illustrated at 83, these magnets being secured to the field frame by lag bolts passing through the threaded openings 84. The field windings are indicated at 85. In case the motor 42 is of the alternating type a squirrel cage rotor 86 may be provided, this rotor being keyed as indicated at 87 to the shaft, and having at each end longitudinally extending tabs 88 which give a strong fanning action.

It has been explained hereinbefore that inasmuch as the motor 42 is secured by the bolts 43 to the slide plate, the rotation of the wheel 23 serves to move the motor and its attached grinding wheel 22 in a vertical direction. The construction of the motor and its bearing together with the improved mechanical arrangement by which the grinding wheel is secured to the motor, assure that there is absolutely no vertical play of the shaft 44 within the motor, even after long usage, so that the position of the grinding wheel 22 can be determined within extremely close limits, even to the extent of .0001" which may be necessary on occasion.

It will be understood that the weight of the motor 42 and the grinding wheel is carried by a threaded rod in order to provide a single control as to the vertical position of the grinding wheel at the hand wheel 23. For that reason considerable study and development work were necessary to provide a suitable form of support which could be readily adjusted in the vertical direction, and yet would not tend to introduce vibration, excessive wear or any other factor by which the grinding wheel 22 would be caused to run out of true. The magnitude of the suspension problem will be appreciated when it is recalled that the shaft 44 operates at an extremely high speed and the motor as well as the suspension actuating element are positioned directly over the grinding wheel, and unless properly designed and protected from dust are bound to show excessive wear which translates itself into errors in the dimensions and shapes of the ground surfaces. However, I have found that the structure which has been shown in detail in Figure 2 lends itself particularly well to all of the rigid requirements for a dust-proof, readily adjustable and accurately set suspension in order to bring the grinding wheel 22 to its proper grinding position in the vertical direction.

It will be understood that I desire to comprehend within my invention such modifications as come within the scope of the claims and the invention.

Having thus fully described my invention, what I claim as new and desire to secure by Letters Patent, is:

1. A grinding machine comprising a grinding wheel carried on the end of a motor actuated shaft, said shaft being mounted on a bearing and terminating in a reduced portion, a cover plate for the bearing, a circular groove in said plate, a sleeve surrounding the reduced portion of the shaft and having an angular extension which is received by said groove, a mat for securing said sleeve to said shaft, and said grinding wheel being secured to one end of said sleeve exterior of said nut.

2. A grinding machine comprising a grinding wheel carried on the end of a motor actuated shaft, said shaft being mounted on a bearing and terminating in a reduced portion, a cover plate for the bearing, a circular groove in said plate, a sleeve surrounding the reduced portion of the shaft and having an angular extension which is received by said groove, a nut for securing said sleeve to said shaft, a spacing element secured to one end of the sleeve beyond said nut, said grinding wheel being secured to the exterior surface of said spacing element.

3. A grinding machine comprising a grinding wheel carried on the end of a motor actuated shaft, said shaft being mounted on a bearing and terminating in a reduced portion, a cover plate for the bearing, a circular groove in said plate, a sleeve surrounding the reduced portion of the shaft and having an angular extension which is received by said groove, said sleeve being secured to the shaft, a spacing element secured to one end of the sleeve, said element having a reduced portion for mounting the grinding wheel, and a clamping plate secured to said last-mentioned portion for securing the wheel to said element.

WILLIAM G. BALDENHOFER.